United States Patent
Torres

(10) Patent No.: US 10,306,870 B2
(45) Date of Patent: Jun. 4, 2019

(54) PROGRAMMABLE TRAINING SYSTEM FOR PETS

(71) Applicant: Terry Lee Torres, Neptune, NJ (US)

(72) Inventor: Terry Lee Torres, Neptune, NJ (US)

(*) Notice: Subject to any disclaimer, the term of this patent is extended or adjusted under 35 U.S.C. 154(b) by 84 days.

(21) Appl. No.: 15/374,131

(22) Filed: Dec. 9, 2016

(65) Prior Publication Data

US 2018/0160652 A1    Jun. 14, 2018

Related U.S. Application Data

(60) Provisional application No. 62/347,593, filed on Jun. 8, 2016.

(51) Int. Cl.
| | | |
|---|---|---|
| *A01K 15/02* | (2006.01) | |
| *H04R 1/28* | (2006.01) | |
| *H04W 4/021* | (2018.01) | |
| *H04W 4/80* | (2018.01) | |
| *H04R 1/02* | (2006.01) | |

(52) U.S. Cl.
CPC ........... *A01K 15/021* (2013.01); *H04R 1/028* (2013.01); *H04W 4/021* (2013.01); *H04R 2420/07* (2013.01); *H04W 4/80* (2018.02)

(58) Field of Classification Search
CPC .. A01K 15/021; H04R 1/028; H04R 2420/07; H04W 4/021; H04W 4/80
USPC ........................................................ 119/719
See application file for complete search history.

(56) References Cited

U.S. PATENT DOCUMENTS

| | | | | |
|---|---|---|---|---|
| 5,307,763 | A * | 5/1994 | Arthur ................ | A01K 15/023 119/718 |
| 7,770,541 | B2 * | 8/2010 | Boyd .................... | A01K 29/00 119/719 |
| 8,839,744 | B1 * | 9/2014 | Bianchi ............... | A01K 15/021 119/720 |
| 2002/0189551 | A1 * | 12/2002 | Patterson ............ | A01K 15/021 119/719 |
| 2006/0219187 | A1 * | 10/2006 | Krishnannurthy ... | A01K 5/0275 119/719 |
| 2012/0137987 | A1 * | 6/2012 | Moulin ............... | A01K 15/023 119/719 |
| 2013/0169441 | A1 * | 7/2013 | Wilson ................ | A01M 29/10 340/573.3 |
| 2013/0180468 | A1 * | 7/2013 | Dutcher .............. | A01K 15/023 119/721 |

(Continued)

*Primary Examiner* — Joshua E Rodden
(74) *Attorney, Agent, or Firm* — Wei & Sleman LLP

(57) ABSTRACT

The invention is a pet training method that uses voice recordings and playback to teach, modify, reinforce or eliminate multiple, user determinable pet behaviors. The user manually records a multiplicity of individual messages in an electronic device attached to the pet that either encourage or discourage certain behaviors in the pet or soothe the pet's anxiety. Playback of the invention's recordings may be user-initiated by manual control or, in a later phase of the training method remotely triggered by proximity detection of one or more discrete location devices. The invention allows the user to control the initial training while providing the flexibility and consistency of an automated training reinforcement process. After the user-controlled initial training process is completed, location devices can be physically positioned anywhere a desired behavior requires modification or reinforcement.

16 Claims, 4 Drawing Sheets

(56) References Cited

U.S. PATENT DOCUMENTS

| | | | |
|---|---|---|---|
| 2013/0220235 A1* | 8/2013 | Wisdom | A01K 15/02 119/719 |
| 2014/0123912 A1* | 5/2014 | Menkes | A61B 5/1105 119/859 |
| 2015/0107531 A1* | 4/2015 | Golden | A01K 11/008 119/719 |
| 2016/0015004 A1* | 1/2016 | Bonge, Jr. | A01K 27/009 119/718 |
| 2017/0265432 A1* | 9/2017 | Anderton | G01S 5/02 |

\* cited by examiner

*a. Continue this training process until the desired behavioral response is achieved by the manual playback of the associated audio file.

*b. Continue this training process until the desired behavioral response is achieved.

** i.e. Behavior logs, instant server and/or text notifications.

PROGRAMMABLE TRAINING SYSTEM FOR PETS

CROSS-REFERENCES TO RELATED APPLICATIONS

Provisional Patent Application No. 62/347,593 Filing Date Jun. 8, 2016

STATEMENT REGARDING FEDERALLY SPONSORED RESEARCH OR DEVELOPMENT

Not applicable

MICROFICHE APPENDIX

Not applicable

BACKGROUND OF THE INVENTION

Field of the Invention

The invention is a method that can be used to help train a pet regardless of the particular behavior being taught or reinforced. It assists the user in training a pet to: (a) engage in positive behaviors; (b) cease engaging in negative behaviors; (c) calm frightened behaviors; or (d) learn various service animal skills. Training a pet can be an imposing task and responsibility. Users cannot always consistently correct the pet's misbehavior on the spot. This training inconsistency often lengthens the period of time it takes the pet to learn. Consistency is one of the key elements in having a pet learn behavioral conditioning quickly and effectively. Further compounding the problem is the fact that the pet's trainer cannot be with the pets all the time. When no one is around, the pets may deviate from the expected behavior without on the spot consequences.

Additionally, pets may experience anxiety when left alone or during stressful times such as thunderstorms or nearby loud construction work. These types of stress may manifest themselves in the pet whining by the front door, barking incessantly, wrecking furniture, chewing shoes, tearing up carpets etc. Users are not always available to be home with the pet to soothe and comfort it during these times to stop these bad behaviors. Further, homes that have more than one pet may have the need to keep the pet's food separate. Especially if one has a special diet or requires medication. If the user is not home, ensuring that pet A stays away from pet B's food or food bowl is impossible.

In addition, it is often hard to read the wants or needs of most pets. Some dogs having to urinate are brought to a physical point of pain before they give an outward sign of whining before we know of their need. Some hungry dogs are brought to a point of licking their empty bowl before we realize the need. In the context of the limitations of our pet's daily services, a dog's bark cannot communicate to their owner whether a mailman, stranger, family or friend has arrived on the property. Seizure alert service dogs are of limited assistance if their patient/owner isn't paying attention when they are trying to alert them of a pending seizure event. Likewise, many other service dogs are limited in their ability to communicate with their owners.

Description of the Prior Art

Historically, pet training involved the direct, one-on-one interaction of a trainer with the pet. Reinforcement of positive behaviors by the pet was rewarded typically by an edible treat. Negative behaviors were "punished" with a loud voice (e.g. "NO") or disagreeable noise (e.g. the rattling of coins in an empty can). Decades ago electrical devices began to be used with the invention of "shock collars" that triggered an electrical shock to the pet when it attempted to cross predetermined boundaries. There is no suggestion in the prior art of any programmable device using the owner's or trainer's own voice to teach both positive behaviors and the avoidance of negative behaviors without the physical presence of the user of the device. In addition, there is no suggestion in the prior art of a training method using a programmable two way communication system in the owner's or trainer's own voice, that the owner can customize to their specific needs, circumstances and/or desires.

The prior art in pet training systems appears to be limited to electronic hardware devices in multiple variations. Most notable is Kates (U.S. Pat. No. 7,861,676 B2, 2011) and its numerous progenitors. Kates describes "a computer-aided training and management system that uses a computer or other processor . . . " (emphasis added) that may incorporate a plethora of other electronic devices to monitor and/or train an animal.

BRIEF SUMMARY OF THE INVENTION

The invention described herein is a method for utilizing wirelessly transmitted audio playback commands (for example using Bluetooth or RF technology) in the user's own voice that continues to work enforcing and reinforcing a pet's behavioral conditioning 24-hours a day, even during periods of the user's physical absence. The invention offers accelerated learning by providing a higher level of training consistency than any user and/or handler can possibly achieve on their own. The invention interacts with the pet automatically using recorded audio messages in the user's own voice. Individual messages are selectively played back by one of two ways: (1) they can be triggered manually during the actual training of the pet; and/or, (2) they can be remotely triggered automatically by the proximity of the pet to a device that is physically positioned at a location where a particular behavior requires teaching or modification.

Another embodiment of the invention deals with the phenomena associated with pet anxiety resulting from being left home alone. Often pets suffering from anxiety may exhibit behaviors such as waiting by the door or window or causing damage within the home. In these instances the invention helps ease the stress that the pet experiences. By using the same process described above, users may record friendly or soothing messages to be played when the pet is found to be spending too much time at the front door, window, by the owner's slippers etc., thereby helping to reduce stress and anxiety.

In another embodiment, the invention allows the pet to be trained to communicate with his/her owner/caregiver by the purposeful triggering of the message playback system in response to the pets wants or needs, environmental based changes (e.g., alert to arrival of mail man or other) and/or the medical alert need of the owner/user.

All of the three devices shown in Drawing FIGS. 1, 2 and 3 are depicted generically and are not intended to depict any particular electronic device now existing. Any device with the functional capabilities described herein may be used with the invention.

DETAILED DESCRIPTION OF THE INVENTION

How the Invention is Used:

The invention is a pet training and automated behavioral conditioning and reinforcement method of training. The system works by Pavlov's theory of classical conditioning. The invention utilizes verbal cues and commands that the pet subsequently associates with specific desired behaviors.

Using device #1, multiple independent short audio files are recorded and stored on device #2. These recordings are made in the owner/users own voice for maximum effectiveness. The method of using owner command recordings is unique in that it commands the pet's attention in a markedly superior method to that of random sounds, clicks or artificially synthesized voices. These recorded audio files are triggered by means of a wireless communication link such as Bluetooth by the user and audibly played back over device #2 during the training phase. The pet will eventually learn to associate each individual recorded message with a particular desired behavior.

Figure 1:
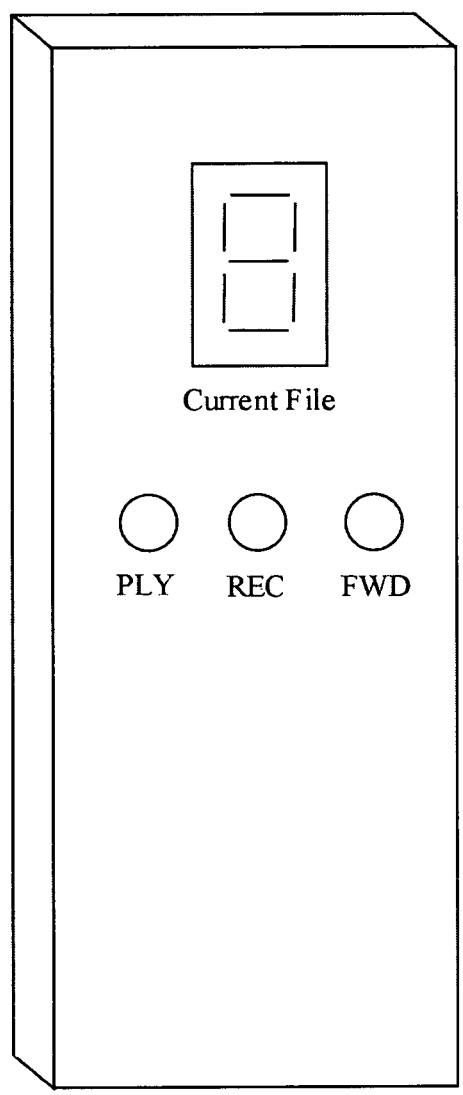
FIG. 1 is an illustration of a simple modular control device ("device #1") as is utilized in the first step of the invention's training method. It incorporates controls to cause the recording, playback and access a plurality of audio files on the device illustrated in FIG. 2. It also incorporates a display to identify the audio file that is currently being accessed. Other functionalities could also be incorporated in this device without interfering with the invention's training method. It is able to communicate wirelessly with the device illustrated in FIG. 2.
Figure 2:
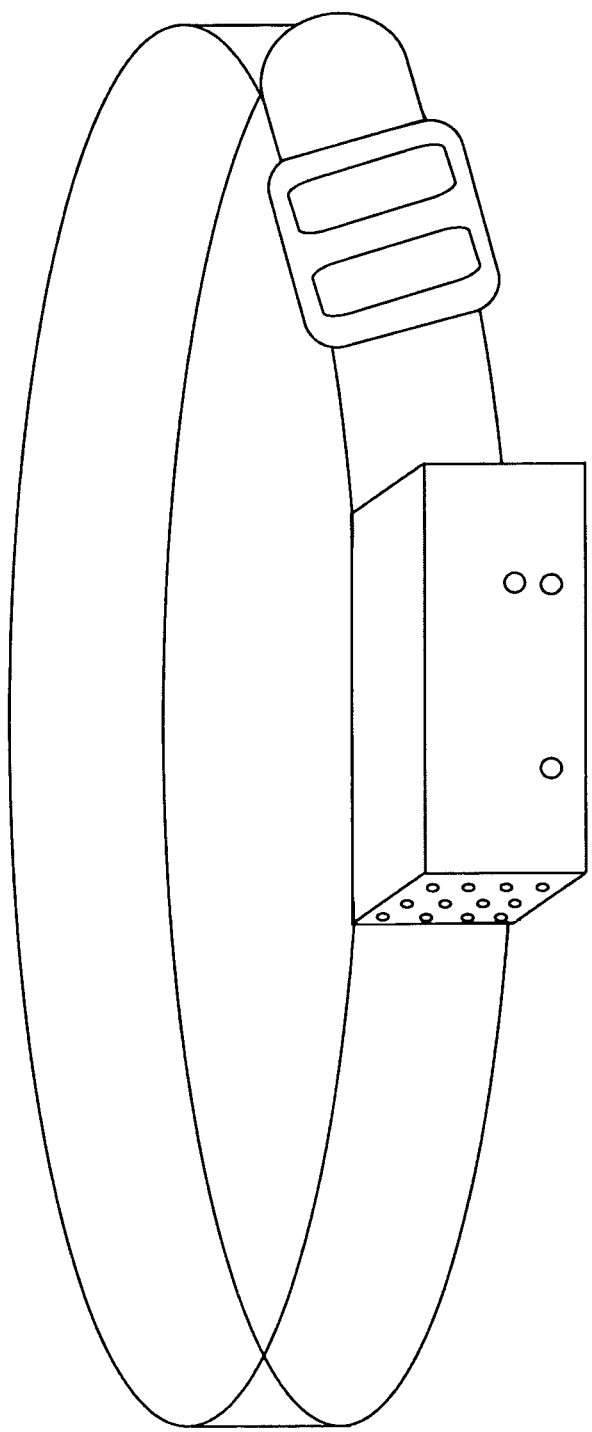
FIG. 2 is a wireless receiver that is physically attached to the pet being trained (device #2") It has the function of recording and playing audio files stored therein. It is the device that is activated by its proximity to the device illustrated in FIG. 3. It might also have visible indicators to show, for example, when the device is actively recording an audio file and/or when the devices battery needs to be replaced.
Figure 3:
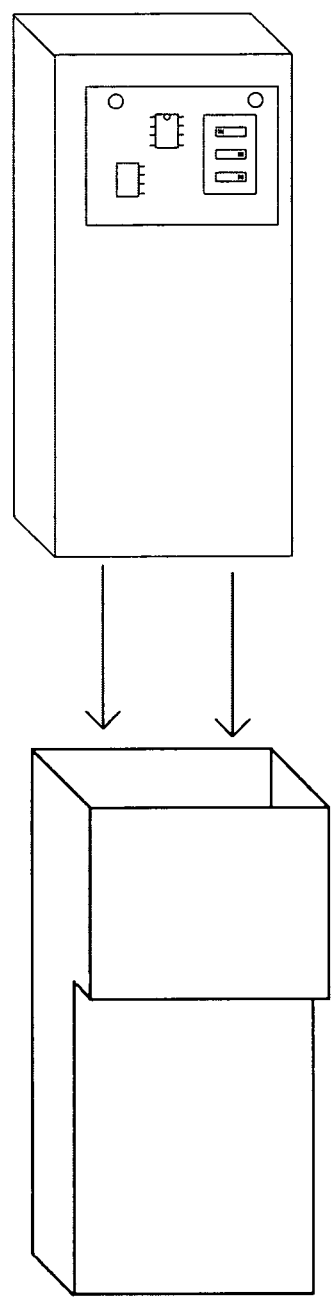
FIG. 3 is a remote signaling device ("device #3") that wirelessly transmits a digital signal. This device periodically transmits a signal that identifies a particular file for playback and is detectable by device #2 when it enters its immediate vicinity. It is programmed by the user to trigger the audio file associated with its location by using control switches or other means.
Figure 4:
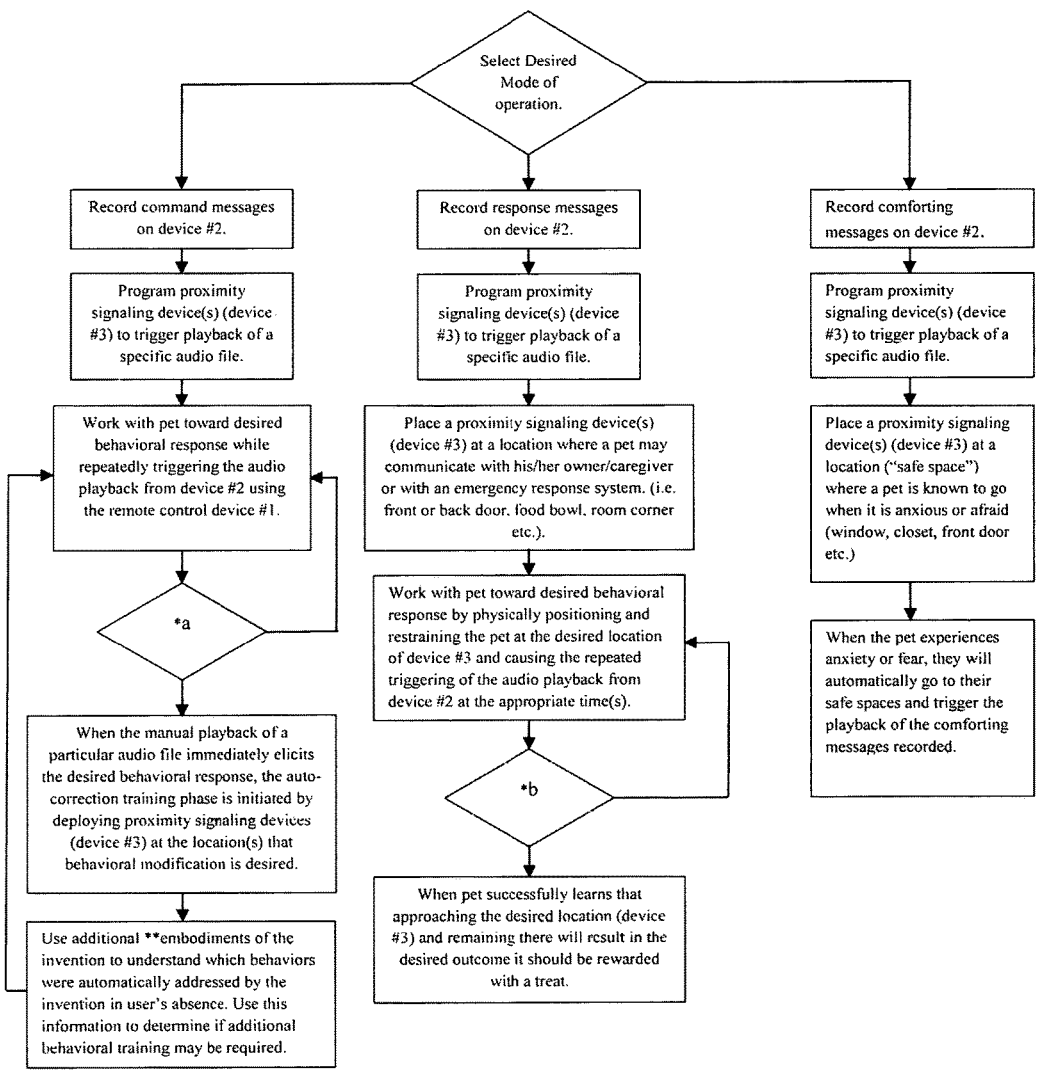
FIG. 4 is a flow diagram illustrating the steps in using the invention.

After the first phase of the pet's training is complete, the method may be used in such a way that the learned behavior is consistently and automatically reinforced without the user's direct intervention. A device such as that illustrated in FIG. 3 remotely triggers the playback of individual audio messages stored in device #2 when the pet comes within 2 to 4 feet of it. The user then manually positions one or more of these proximity signaling devices at one or more locations where it is desired to modify or reinforce the pet's behavior. The user "programs" the proximity signaling devices to activate the audio playback of a specific recorded message associated with a particular pet behavior that occurs at a particular physical location. The appropriate audio message file is then automatically played back over device #2 when it is in physical proximity to any one of various proximity signaling devices that may be deployed at any particular location. After a brief pause the message will be repeated until the pet physically moves out of the immediate vicinity of the particular proximity signaling device.

For example, if the pet is not allowed on the couch, the user would record a message admonishing the pet for this behavior. The user would then activate device #1 to trigger the playback of the admonishing message while physically removing the pet from the couch. The user would repeat this playback and removal process as many times as required. Eventually the pet will learn to associate the audible message with the desired behavior of getting off the couch without the owner needing to physically remove the pet.

At this time the user will initiate the second phase of the invention by activating device #3 and placing it under the cushion of the couch. Now, when and only when the pet jumps on the couch, the device attached to the pet (device #2) detects its proximity to device #3 and automatically initiates the playback of the appropriate admonishing message. The pet hears the message and jumps off the couch. The invention uses individual messages that may be triggered via numerous device #3s individually deployed in differing physical locations. Each individual message is triggered by its own discrete device #3.

In another described embodiment of the method, the user teaches a pet how to communicate back to the user using only the device attached to the pet (device #2) and a proximity signaling device (device #3). For example, to teach a pet to communicate the need to be taken for a walk or to be let out of a dwelling the user would: (1) Record a message on device #2 such as, "Please take me for a walk, I've got to go!"; (2) place a device #3 at any desired location (in this case by the front door). (3) Subsequently, when the user notices the pet wanting to go out, the user would work with the pet and cause him to physically approach and wait by the location of the proximity device #3. In this example by the front door. This will cause the device #2 to begin it's playback of the desired message and keep repeating this specific message as long as the pet remains within 2 to 4 feet of device #3. When the pet hears the message playback 3 or 4 times the user should thereafter take the pet out for a walk. Over time the pet will learn to associate this action and the playback of this particular message with the expectation of being taken for a walk. To encourage this type of learning the user may reward the dog with a treat for the eventual successful execution of this new learned behavior. Further, utilizing the same training approach described above in the talk to me mode of operation, a seizure service dog can be taught to trigger a specific Proximity Signaling Module (that are placed at specific locations within a dwelling or office) that causes an audio alert to sound out loud, from his collar, in response to a pending critical seizure event. In addition, a user's pet can be taught to communicate a variety of environmental and/or medical events to the user using the same training method.

In another embodiment of the invention it uses a USB or RF or other type of wireless connection in device #2 which would allow the user access to a number of notification features incorporated in the present invention. Using such an interface a user may access Behavior Logs (described later in this specification) and a menu that allows the user to enable or disable specific alert notification types.

Depending upon the specific capabilities of the electronic devices chosen by the pet trainer/user to implement this invention's features, additional training capabilities of the invention are available. For example, a USB interface in device #2 might allow the user to view the device's operational history (where, when and how often device #2 was triggered on an hourly, daily or calendar basis) to determine the amount of additional training, if any, necessary to accomplish the desired training results. In another example, a Bluetooth capability in device #2 would allow access to the command history via the user's smart phone. Likewise, a wi-fi capability could be incorporated in the device allowing the user to further customize the invention. Offering instant server based notifications, behavior Logs, email updates and/or any other resources available through online communications. Other capabilities would be obvious to one skilled in the arts as new electronic technologies are invented.

What is claimed is:

1. A method for training an animal comprising the steps of:
　recording, by a user, of a plurality of audio messages encouraging or commanding the animal to engage in, refrain from engaging in or cease engaging in a plurality of user-determined behaviors;
　storing the plurality of audio messages in a memory of a collar module to be worn by the animal;
　audibly broadcasting a user-selected audio message simultaneously with the user physically controlling the animal to engage in, refrain from engaging in or ceasing from engaging in the activity referenced by the user-selected audio message;
　physically placing at least one proximity signaling device at one location where the user-determined behaviors are likely to be engaged by the animal when the user in not physically present;
　detecting the presence of the at least one proximity signaling device within a fixed or user-selected distance from the collar module; and
　triggering an audio broadcast from the collar module of a user-selected message particular to the behavior associated with the device and heard by the animal based on the collar module's presence near the at least one proximity signaling device.

2. The method of claim 1, wherein physically placing at least one proximity signaling device at a location includes physically placing a plurality of proximity signaling devices, each of the plurality of proximity signaling devices being placed at a different location.

3. The method of claim 2, wherein each of the plurality of proximity signaling devices is associated with at least one audio broadcast.

4. The method of claim 2, further comprising the step of storing information on the collar module related to certain behaviors of the animal.

5. The method of claim 4, wherein storing information on the collar module comprises logging of the frequency of detecting each of the plurality of proximity signaling devices.

6. The method of claim 5, wherein storing information on the collar module comprises information on when each of the plurality of proximity signaling devices was detected.

7. The method of claim 4, further comprising the step of transferring the information from the collar module to a computer or mobile device.

8. The method of claim 1, further comprising the step of providing a command module in communication with the collar module.

9. The method of claim 8, wherein the step of audibly broadcasting a user-selected audio message simultaneously with the user physically controlling the animal includes using the command module to trigger audible broadcasting.

10. The method of claim 1, wherein detecting the presence of the at least one proximity signaling device includes using at least one of radiofrequency, Bluetooth or GPS technology.

11. The method of claim 1, further comprising the step of sending a message to the user in response to one of a plurality of user-specified events associated with one of the at least one proximity signaling device.

12. The method of claim 11, wherein sending a message to the user comprises sending a text message.

13. The method of claim 11, wherein sending a message to the user comprises sending an audible message.

14. The method of claim 11, wherein sending a message to the user comprises broadcasting a message from the collar module to alert the user.

15. The method of claim 14, wherein sending a message to the user comprises broadcasting a message from the collar module to alert the user of a seizure event.

16. The method of claim 1, wherein recording, by a user, of a plurality of audio messages includes recording a plurality of audio messages in the user's own voice.

* * * * *